United States Patent [19]
Alvarez et al.

[11] Patent Number: 4,912,176
[45] Date of Patent: Mar. 27, 1990

[54] SINTERED POLYBENZIMIDAZOLE/-POLYARYLENEKETONE ARTICLES AND METHOD OF MANUFACTURE

[75] Inventors: Edwardo Alvarez; Lorenzo P. DiSano, both of Houston, Tex.; Bennett C. Ward, Charlotte, N.C.

[73] Assignee: Hoechst Celanese Corporation, Somerville, N.J.

[21] Appl. No.: 340,367

[22] Filed: Apr. 13, 1989

Related U.S. Application Data

[63] Continuation-in-part of Ser. No. 223,856, Jul. 25, 1988, Pat. No. 4,861,537.

[51] Int. Cl.[4] ........................... C08L 77/06; C08J 9/24

[52] U.S. Cl. .................................. 525/435; 521/134; 521/919

[58] Field of Search ................. 521/134, 919; 525/435

[56] References Cited

U.S. PATENT DOCUMENTS

| | | | |
|---|---|---|---|
| 3,340,325 | 9/1967 | Suffredini | 525/435 |
| 4,020,142 | 4/1977 | Davis et al. | 525/435 |
| 4,628,067 | 12/1986 | Chen, Sr. et al. | 525/435 |

Primary Examiner—Morton Foelak
Attorney, Agent, or Firm—Forrest D. Stine

[57] ABSTRACT

Sinterd molded article having improved thermal resistance and strength formed from a homogeneous mixture comprising from about 5 to 75 percent by weight polybenzimidazole and from about 95 to 25 percent by weight of a polyaryleneketone.

13 Claims, No Drawings

SINTERED POLYBENZIMIDAZOLE/POLYARYLENEKETONE ARTICLES AND METHOD OF MANUFACTURE

Related Applications

This application is continuation-in-part of application Ser. No. 223,856 filed July 25, 1988 now U.S. Pat. No. 4,861,537.

This invention relates to sintered polybenzimidazole/polyaryleneketone molded articles of manufacture and methods for manufacturing such articles. More particularly this invention is directed to sintered articles formed from a blend of polybenzimidazoles and polyaryleneketones.

BACKGROUND OF THE INVENTION

Polybenzimidazoles and polyaryleneketones are polymers of high thermal stability and excellent resistance to oxidative or hydrolytic degradation. As taught by the published literature, polybenzimidazole polymers may be prepared, for example, by melt polymerizing an aromatic tetraamine and a diphenylester or an anhydride of an aromatic or heterocyclic dicarboxylic acid in a one or two stage process; see, for example H. Vogel and C. S. Marvel, Journal of Polymer Science, Vol. L, pages 511-539 (1961); and U.S. Pat. Nos. Re. 26,065, 3,174,947; 3,509,108; 3,551,389; 3,433,772; and 3,655,632. In particular, U.S. Pat. No. 3,551,389 discloses a two stage process for the production of aromatic polybenzimidazoles, in which the monomers are heated at a temperature above 170° C. in a first stage melt polymerization zone until a foamed prepolymer is formed. The foamed prepolymer is cooled, pulverized, and introduced into a second stage polymerization zone where it is heated again to yield a polybenzimidazole polymer product.

It has also been known to prepare polybenzimidazoles from the free dicarboxylic acids or the methyl esters of such acids rather than the phenyl esters or anhydrides in a melt polymerization process. Polybenzimidazoles produced utilizing certain dicarboxylic compounds as monomers have repeating units of the following formula:

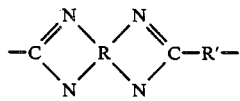

wherein R is a tetravalent aromatic nucleus with the nitrogen atoms forming the benzimidazole rings being paired upon adjacent carbon atoms, i.e., ortho carbon atoms, of the aromatic nucleus, and R' is a member of the class consisting of an aromatic ring; an alkylene group (preferably having 4 to 8 carbon atoms); and a heterocyclic ring such as pyridine, pyrazine, furan, quinoline, thiophene, and pyran. Depending on whether the dicarboxylic acid moieties in the dicarboxylic monomer component are the same or different, R' may be the same or randomly different among the repeating units along the polymer chain. Moreover, depending on whether one or more than one tetraamine monomer is utilized in the polymerization, R may also be the same or randomly different along the polymer chain.

The following generalized equation illustrates the condensation reaction which occurs in forming the polybenzimidazoles having the recurring units of the foregoing formula:

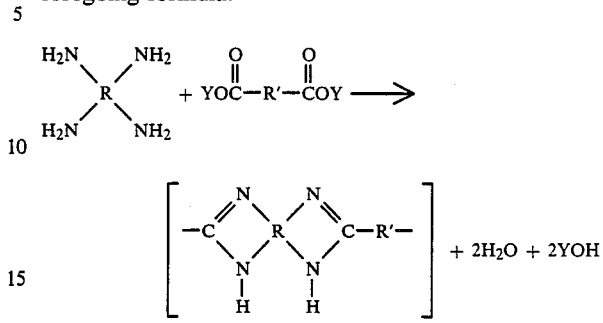

which R and R' are as previously defined. Such polybenzimidazoles are produced by the reaction of a mixture of (1) at least one aromatic tetraamine containing two groups of amine substituents, the amine substituents in each group being in an ortho position relative to each other, and (2) a dicarboxylic component as indicated in the foregoing equation and as more completely defined hereinafter.

Aromatic tetraamines which may be used, for example, are those with the following formulas:

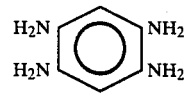

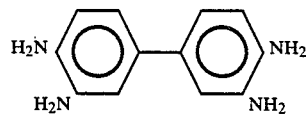

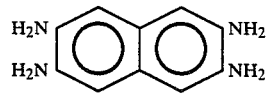

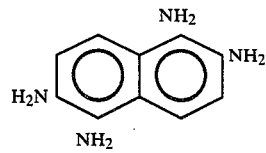

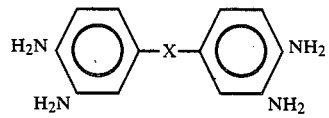

where X represents —O—, —S—, —SO$_2$, —C—, or a lower alkylene group, such as —CH$_2$—, —(CH$_2$)$_2$—, or —C(CH$_3$)$_2$—. Among such aromatic tetraamines may be mentioned, for example, 1,2,4,5-tetraaminobenzene; 1,2,5,6-tetraaminonaphthalene; 2,3,6,7-tetraaminonaphthalene; 3,3',4,4'-tetraaminodiphenyl methane; 3,3',4,4'-teraaminodiphenyl ethane; 3,3',4,4'-tetraaminodiphenyl-2,2-propane; 3,3',4,4'-tetraaminodiphenyl thioether; and 3,3',4,4'-tetraaminodiphenyl sulfone. The preferred aromatic tetraamine is 3,3',4,4'-tetraaminobiphenyl.

The compounds which comprise the dicarboxylic component of this invention are defined by the formula:

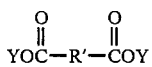

in which the Y's may be hydrogen, aryl or alkyl with no more than 95% of the Y's being hydrogen or phenyl. The dicarboxylic component may therefore consist of a mixture of a free acid with at least at one diester and/or monoester; a mixture of diester(s) and/or monoester(s); or a single dialkyl ester, monoester or mixed aryl-alkyl or alkyl/alkyl ester but can consist completely of free acid or diphenyl ester. When Y is alkyl, it preferably contains 1 to 5 carbon atoms and is most preferably methyl. When Y is aryl, it may be any monovalent aromatic group obtained by filling with hydrogen all the valences but one of the aromatic groups which may be R or R' as disclosed previously, either unsubstituted or substituted with any inert monovalent radical such as alkyl or alkoxy containing 1 to 5 carbon atoms. Examples of such aryl groups are phenyl, naphthyl, the three possible phenylphenyl radicals and the three possible tolyl radicals. The preferred aryl group is usually phenyl.

The dicarboxylic acids which are suitable in free or esterified form as part of the dicarboxylic component as previously described for use in the production of polybenzimidazoles by the process of the present invention include aromatic dicarboxylic acids; aliphatic dicarboxylic acids (preferably, those having 4 to 8 carbon atoms); and heterocyclic dicarboxylic acids wherein the carboxylic groups are substituents upon carbon atoms in a ring compound such as pyridine, pyrazine, furan, quinoline, thiophene, and pyran.

Dicarboxylic acids which may be utilized in free or esterified form as described are aromatic dicarboxylic acids such as those illustrated below:

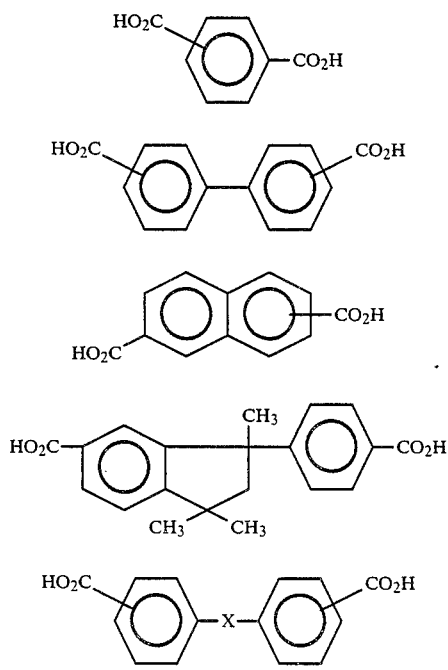

where X is as defined above For example, the following diacids can suitably be employed: isophthalic acid; terephthalic acid; 4,4'-biphenydicarboxylic acid; 1,4-naphthalene-dicarboxylic acid; diphenic acid (2,2'-biphenyldicarboxylic acid); phenylindandicarboxylic acid; 1,6-napthalenedicarboxylic acid; 2,6-naphthalenedicarboxylic acid; 4,4'-diphenyletherdicarboxylic acid; 4,4'-diphenylsulfonedicarboxylic acid; 4,4'-diphenylthioetherdicarboxylic acid. Isophthalic acid is the dicarboxylic acid which in free or esterified form is most preferred for use in the process of the present invention.

The dicarboxylic component can be one of the following combinations:(1) at least one free dicarboxylic acid and at least one diphenyl ester of a dicarboxylic acid; (2) at least one free dicarboxylic acid and at least one dialkyl ester of a dicarboxylic acid, and (3) at least one diphenyl ester of a dicarboxylic acid and at least one dialkyl ester of a dicarboxylic; and (4) at least one dialkyl ester of a dicarboxylic acid. The dicarboxylic moieties of the compounds of each combination may be the same or different and the alkyl groups of the alkyl esters of combinations (2), (3) and (4) generally contain 1 to 5 carbon atoms and are most preferably methyl. The dicarboxylic component can be employed in a ratio of about 1 mole of total dicarboxylic component per mole or aromatic tetraamine. However, the optimal ratio of reactants in a particular polymerization system can be easily determined by one of ordinary skill in the art.

Examples of polybenzimidazoles which may be prepared according to the process as described above include:
poly-2,2'-(m-phenylene)-5,5'-bibenzimidazole;
poly-2,2'-(biphenylene-2"2"')-5,5'-bibenzimidazole;
poly-2,2'-(biphenylene-4"4"')-5,5'-bibenzimidazole;
poly-2,2'-(1", 1", 3"trimethylindanylene-3"5"-p-phenylene-5,5'-bibenzimidazole;
2,2'-(m-phenylene)-5,5'-bibenzimidazole/ 2,2-(1", 1", 3"-trimethylindanylene)-5", 3"-(p-phenylene)-5,5'-bibenzimidazole copolymer;
2,2'-(m-phenylene)-5,5-bibenzimidazole2,2'-biphenylene-2", 2"')-5,5'-bibenzimidazole copolymer;
poly-2,2'-(furylene-2", 5")-5,5'-bibenzimidazole;
poly-2,2'-(naphthalene-1", 6")-5,5'-bibenzimidazole;
poly-2,2'-(naphthalene-2", 6")-5,5'-bibenzimidazole;
poly-2,2'-amylene-5,5'-bibenzimidazole;
poly-2,2'-octamethylene-5,5'-bibenzimidazole;
poly-2,2'-(m-phenylene)-diimidazobenzene;
poly-2,2'-cyclohexenyl-5,5'-bibenzimidazole;
poly-2,2'-(m-phenylene)-5,5'-di(benzimidazole) ether;
poly-2,2'-(m-phenylene)-5,5'-di(benzimidazole) sulfide;
poly-2,2'-(m-phenylene)-5,5'-di(benzimidazole) sulfone;
poly-2,2'-(m-phenylene)-5,5'-di(benzimidazole) methane;
poly-2,2"-(m-phenylene)-5,5"-di(benzimidazole) propane-2,2; and
poly-ethylene-1,2-2,2"-(m-phenylene)-5,5"-dibenzimidazole) ethylene-1,2 where the double bonds of the ethylene groups are intact in the final polymer.

Poly-1,2'-(m-phenylene)-5,5'-bibenzimidazole, a preferred polymer, can be prepared by the reaction of 3,3', 4,4'-tetraaminobiphenyl with a combination of isophthalic acid with diphenyl isophthalate or with a dialkyl isophthalate such as dimethyl isophthalate; a combination of diphenyl isophthalate and a dialkyl isophthalate such as dimethyl isophthalate; or at least one dialkyl isophthalate such as dimethyl isophthalate, as the sole dicarboxylic component.

Although the sintering of polybenzimidazole (PBI) resins in the manner described herein is not known in the art, the compression molding of PBI resins and the sintering of a mixture of PBI polymer and prepolymer has been effected. Levine (Encycl. Polymer Sci. Technol., 11, 188) reported in 1969 the matched metal compression molding of low molecular weight PBI having an inherent viscosity (IV) of 0.05–0.1 dl/g as a 0.4% weight solution in 97% sulfuric acid. The compression product was reported to have a tensile strength (unfilled) of 17000–25000 psi and a compressive strength (yield) of 54 thousand pounds per square inch.

The process for sintering PBI polymers in which a prepolymer was used as a sintering aid is described in U.S. Pat. No. 3,340,325. As described therein, the prepolymer was prepared by reacting a diphenyl ester of an aromatic dicarboxylic acid and an aromatic tetraamine to a degree short of substantial infusibility. The prepolymer is fusible at temperatures in the range of from about 200° F. to about 500° F. The mixture of PBI prepolymer and PBI polymer having a melting point greater than 1500° F. was introduced into a mold with sufficient heat and pressure applied to cause the prepolymer to become fluid and the mixture was maintained under sufficient heat and pressure to cure the prepolymer.

The previously described prepolymer molding processes have two distinct disadvantages. The prepolymer off-gases significant amounts of phenol when employing a phenyl ester, for example, and water during cure, necessitating the care in tailoring a cure cycle and leading to either high void contents or limited part thickness. The prepolymer also contains detectable amounts of residual 3,3′,4,4′-tetraaminobiphenyl (TAB) monomer. As such, care must be taken when handling this material to insure that no worker contact occurs.

In 1985 Jones et al reported (International Conference on Composite Materials IV, AIME, Warrendale, Pa., p 1591) the compression molding of PBI polymer at temperatures of 600° to 800° F., pressures of 2000 psi and final hold times of over one hour. The product molded articles had tensile strengths of 7000 psi. Employing the described process, only one part could be made per mold per cycle, with total cycle times limited to one per normal eight hour shift and part thickness was effectively limited to less than one inch.

Ward [1][2] and Harb, et al[3] reported matched metal die compression molding of PBI at temperatures of up to 875° F., pressures of 5,000 to 10,000 psi and cycle time of 4–8 hours which resulted in molded PBI parts, limited to ¼ inch in thickness, with tensile strength of up to 21,000 psi. In order to achieve high tensile strength, however, it was necessary to utilize a resin with an IV of 1.1 dl/g. Use of resin with lower molecular weight resulted in correspondingly lower tensile strength of the molded article.

Ward, B.C., Fabricating Composites '86, SME Composites Group, Baltimore, Md. (September, 1986), EM86-704.
Ward, B. C., 32nd International Sampe Symposium, Anaheim, Calif., (Apr. 6–9, 1987) pp. 853–867.
Harb, M. E., Treat, J. W., Ward, B. C., ibid pp. 795–806.

In addition, the resin used typically had a particle size such that it would pass through a 35 mesh screen. Resin with smaller particle size (passing through a 100 mesh screen) was found to be extremely difficult to mold, with the articles molded from 100 mesh resin exhibiting severe cracking, so as to render them useless for any testing or utility.

Also, molded articles made via matched metal die compression molding exhibited significant blistering and dimensional distortion when exposed to temperatures of 900° F. for as little as 5 minutes This phenomenon greatly limits the utility of these articles in high temperature resistant applications.

With respect to molding polyaryleneketones, various molding techniques, such as sinter molding, injection molding and compression molding are known in the art. However, molded articles of polyaryleneketones have limited thermal and pressure resistance.

SUMMARY OF INVENTION

By the invention, sintered PBI/polyaryleneketone molded articles are obtained having excellent mechanical, thermal and chemical resistance properties. Large an small sintered PBI/polyaryleneketone articles can be obtained by blending a PBI and a polyaryleneketone, cold compacting the blend, heating the molded article, cooling the molded article while maintaining the molded article in a pressurized state, and postcuring the molded article.

DESCRIPTION OF PREFERRED EMBODIMENT

The PBI polymers suitable in preparing the sintered articles of this invention are those previously described having an inherent viscosity (IV) of greater than 0.4 dl/g when measured at a concentration of 0.4 gram of polymer in 100 ml of 97 weight percent sulfuric acid at 25° C. The PBI polymer is in particulate form with the particle size preferably being such that the particles pass through a 100 mesh screen.

The polyaryleneketones of this invention have the general formula:

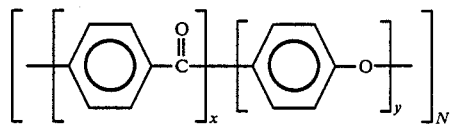

Where X, Y and N are integers. An exemplary polyaryleneketone is polyetherketone having the repeating unit:

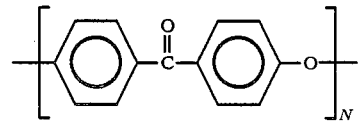

Polyetheretherketone, having the repeating unit:

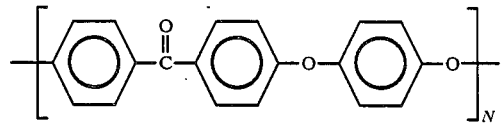

is also a crystalline thermoplastic having properties similar to those of polyetherketones and can be employed in the invention.

A third exemplary polyaryleneketone is polyetheretherketoneketone having the repeating unit:

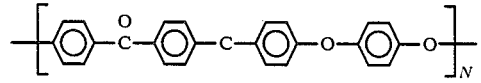

A fourth exemplary polyaryleneketone is polyetherketoneketone having the repeating unit:

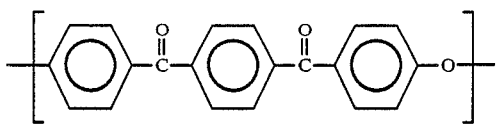

A fifth exemplary polyaryleneketone useful in the practice of the invention has the following structures:

Type I

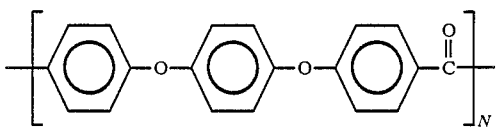

Type II

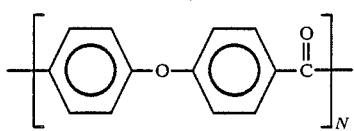

In general polybenzimidazoles have good chemical resistance, high compressive strength and retain these properties at high temperature. Polyaryleneketones have good chemical resistance and moderate compressive strength but exhibit poorer mechanical properties at elevated temperatures as compared to polybenzimidazole. As stated above, articles molded of polybenzimidazole have limited utility because of processing limitations, whereas articles molded of polyaryleneketones have limited utility because of limited thermal and pressure resistance.

It has been found in the present invention that a molded article can be produced having excellent thermal and chemical resistance and strength properties by forming a homogeneous blend of a PBI and a polyaryleneketone. The blend comprises from about 5 to 75 percent by weight PBI and correspondingly, from about 95 to 25 percent by weight of a polyaryleneketone. As with the PBI resin, the polyaryleneketone resin employed is in particulate form with the particle size preferably being such that the particles pass through a 100 mesh screen. The smaller particles permit the production of filled PBI/polyaryleneketone blended articles utilizing fillers such as graphite, glass, chopped carbon fiber, etc.

The PBI and polyaryleneketone polymers and optional fillers can be blended in a high speed mixer to form a homogeneous blend thereof. This homogeneous mixture can have some residual water and other volatiles which must be removed to maximize density, decrease voids, and prevent cracking of the finished article. To obtain a blended resin having less than 0.1 weight percent water and volatiles, the blended resin can be heated in an oven to a temperature of at least 350° F. and maintained at this temperature for at least 4 hours.

The dried particulate blend is placed in a mold which is sealed so as to prevent the flow of oxygen into the mold during the compacting step. If a filler is employed, the filler is mixed with the blend and the mixture placed in the mold with the filler comprising from 0.1 to 80 weight percent of the resin and filler mixture. At ambient temperature (less than 400° F.) the blend is compacted at a pressure in the range of 2000 to 20,000 pounds per square inch (psi), preferably at a pressure in the range of 5000 to 20,000 psi, for a period of at least two minutes. The pressure is then removed from the formed article and the article heated to a temperature in the range of 750°–950° F., preferably to a temperature of at least 800° F., and maintained at that temperature for a period of time of at least 4 hours and normally for a period ranging from 4 to 24 hours. Following the heating step, the resin is again compacted under a pressure in the range of 2000 to 20,000 psi until the resin is cooled to a temperature below 800° F.

The molded article of the PBI/polyaryleneketone can then optionally be postcured by heating to a temperature in the range of 450°–500° F., preferably 475° F., freestanding, or heating to a temperature in the range of 800°–950° F. under constraint so as to prevent expansion of the article, and maintaining the article at this temperature during the heating step for a period of at least one hour.

Although a single sintered, molded PBI article can be produced in accordance with the above-described process, the simultaneous manufacture of several molded articles can be effected employing a single mold. For example, multiple sintered PBI/polyaryleneketone disks can be obtained by alternatively placing or "stacking" PBI/polyaryleneketone resin and plugs in the mold prior to the initial pressurization of compaction step.

The sintered articles of this invention exhibit improved mechanical, thermal and chemical properties as compared to conventional polyaryleneketones. The molded article has a tensile strength and modulus of greater than 15,000 psi and $0.65 \times 10^6$ psi, respectively (ASTM D 638). The sintered articles exhibit more resiliency than polybenzimidazole articles using existing molding techniques and improved thermal resistance than molded polyaryleneketone articles. The sintered articles are also highly chemically resistant to ketones, organic acids, oil well brines, oil well sour gas and hydrocarbons and have improved sealing properties. Accordingly, the sintered molded articles of manufacture are particularly effective in applications where requirements cannot be met by other resins including virgin polyaryleneketones and filled polyaryleneketones—in extreme high temperatures and pressures, in harsh chemical environments, or in applications where durability and wear resistance are important. Molded articles of manufacture having complex shapes and geometries are particularly useful in gaskets, seals, O-ring backups and valve seats in oil wells, and in geothermal, petrochemical, and other industrial applications.

Molded articles can also be formed by adding polybenzimidazole chopped fibers having a length of from 1/64 inch to about ½ inch, with 1/32 inch being preferred, and may be mixed in with the blend in amounts ranging from about 5 to 15 percent by weight with 10 percent being preferred. The chopped fibers may be either sulfonated or unsulfonated. The addition of the fibers not only improves the mechanical and chemical properties as above, but also the thermal stability of the articles and specifically the weight loss temperature can be improved by about 10 to 20 percent.

The invention will be further illustrated by way of the following examples, the specifics of which should be considered non-limiting and exemplary of the invention.

EXAMPLE I

Poly-2,2'-(m-phenylene)-5,5'-bibenzimidazole 100 mesh powder resin having an inherent viscosity of 0.55 dl/g was added to a polyetherketone resin available from ICI as Victre ® polyetherketone to form a weight mixture of 45/55 polybenzimidazole/polyetherketone. To this mixture was added 0.25 weight percent of a coupling agent whose active ingredient was neoalkenolato tris (3-amino) phenylato zirconium (VI). The ingredients were combined in a dry mixer and then dried for 16 hours in a forced air convection oven at 390° F. The dried resin (3.75) (pounds) was loaded into a hollow steel mold with a 4.25 inch outside diameter and a 2.375 inch inside diameter, and which was 30 inches long, fitted with plugs at both ends. The mold was then cold pressed on a 75-ton hydraulic press at 5,000 psi pressure for five minutes.

The mold was transferred to a forced air convection oven which was maintained at a temperature of 760° F. The mold remained in the oven for 6.5 hours. During this period the mold was removed from the oven twice and 5,000 psi pressure applied to the mold for five minutes each time.

After the 5-hour period, the mold was removed from the oven and 6,000 psi pressure was immediately applied to the mold for 20 minutes. The pressure was then removed, and the mold was allowed to continue to cool. After an additional 45 minutes, the inner mandrel was removed from the mold and the article wa ejected from the mold using a small hydraulic press. The molded article was then placed in a 500° F. oven for two hours to anneal the molded article. The molded article was 4.25 inches outside diameter, 2.375 inches inside diameter, 6 inches in length with a density of 1.28 g/cc. No cracks, voids or other imperfections were visible in the article. Test results for this article and the articles of following Examples II-V are shown in Tables 1 and 2.

EXAMPLE II

The process of Example I was repeated, except the weight percent ratio of the polybenzimidazole to polyetherketone was 50/50.

EXAMPLE III

The process of Example II was repeated with the exception that polyetheretherketone powder available from ICI as Victrex 450 PF polyetheretherketone powder was substituted for the polyetherketone.

EXAMPLE IV

The process of Example III was repeated with the exception that the polybenzimidazole/polyetheretherketone weight percent ration was 40/60.

EXAMPLE V

The process of Example IV was repeated except the polybenzimidazole/polyetheretherketone weight percent ratio was 33/67.

TABLE 1

| Example No. | Weight Ratio | Compressive Strength at 10% Strain, psi (ASTM 695) | Compressive Modulus, mpsi (ASTM D 695) |
|---|---|---|---|
| I | 45/55 PBI/PEK | 33,000 | 0.70 |
| II | 50/50 PBI/PEK | 33,000 | 0.70 |
| III | 50/50 PBI/PEEK | 30,000 | 0.68 |
| IV | 40/60 PBI/PEEK | 28,000 | 0.68 |
| V | 33/67 PBI/PEEK | 27,000 | 0.66 |

TABLE 2

| Example No. | Weight % Ratio | Ave. Tensile Strength, psi | Tensile Strain, % | Initial Modulus mpsi |
|---|---|---|---|---|
| II | 50/50 PBI/PEK | 17,000 | 2.8 | 0.74 |
| III | 50/50 PBI/PEEK | 16,000 | 3.8 | 0.69 |

Referring to Tables 1 and 2, the sintered molded articles of the invention have excellent compressive and tensile properties.

EXAMPLE VI

A seal evaluated as a steam-sealing element for use in oil well blow out preventing devices was molded as described in Example I. The sealing element was able to obtain a positive seal at 75° F. and at a pressure below 20 kpsi, and the seal was maintained in a live steam environment of 600° F. Sintered molded polybenzimidazole is too stiff to be sealed at 75° F. and molded virgin and glass filled polyaryleneketones fail at temperatures of about 450° F.

EXAMPLE VII

The process of Example III was repeated except that 10 percent by weight of sulfonated polybenzimidazole fiber cut in 1/8 inch lengths was mixed with the mixture of polybenzimidazole powder and polyetheretherketone powder. The test results for the articles of Examples VII and VIII are shown in Table 3.

EXAMPLE VIII

The process of Example VII was repeated except that 10 percent by weight of unsulfonated polybenzimidazole fibers were used in place of sulfonated polybenzimidazole fibers. Weight loss temperature as employed in the Table 3 refers to the temperature at which the solid has lost 10 percent of its weight.

TABLE 3

| Example No. | Ratio | Compressive Strength at 10% Strain psi | Compressive Modulus, mpsi | Weight Loss Temperature (°F.) |
|---|---|---|---|---|
| III | 50/50 PBI/PEEK no fibers | 30,000 | 0.68 | 875° |
| VII | 45/45/10 PBI/PEEK/ Sulfonated fibers | 34,000 | 0.72 | 1000° |
| VIII | 45/45/10 | 34,000 | 0.70 | 1000° |

TABLE 3-continued

| Example No. | Ratio | Compressive Strength at 10% Strain psi | Compressive Modulus, mpsi | Weight Loss Temperature (°F.) |
|---|---|---|---|---|
| | PBI/PEEK/ Unsulfonated fibers | | | |

Thus, referring to Table 3, either sulfonated or unsulfonated fibers can be used, and the thermal stability can be improved as evidenced by the weight loss temperature increase of 125° F.

EXAMPLE IX

An O-ring backup for evaluation in a high temperature sealing test fixture was molded as described in Example VII. The O-ring backup was able to maintain a seal at 500° F., 20 kpsi pressure, 200 hour exposure in a silicon oil medium. O-ring backups made of virgin or filled polyaryleneketones exhibited catastrophic failure under the same conditions.

That which is claimed is:

1. A sintered molded article having improved thermal resistance and strength formed from a homogeneous mixture comprising from about 5 to 75 percent by weight polybenzimidazole and from about 95 to 25 percent by weight of a polyaryleneketone.

2. A molded article according to claim 1 wherein the polyaryleneketone is selected from the group consisting of polyetherketone, polyetheretherketone, polyetheretherketoneketone and polyetherketoneketone.

3. A molded article according to claim 1 wherein said homogeneous mixture comprises a blend of from about 33 to 50 percent by weight polybenzimidazole and from about 67 to 50 percent by weight of a polyaryleneketone.

4. A molded article according to claim 1 wherein said article is selected from the group consisting of O-ring backups, seals, gaskets and valve seats.

5. A molded article according to claim 1 wherein the polybenzimidazole is poly-2,2'-(m-phenylene)-5,5'-bibenzimidazole.

6. A sintered molded article having improved thermal resistance and strength formed from a homogeneous mixture comprising from about 5 to 75 percent by weight polybenzimidazole, from about 95 to 25 percent by weight of a polyaryleneketone and from about 5 to 15 percent by weight of cut fibers of polybenzimidazole.

7. A molded article according to claim 6 wherein the polyaryleneketone is selected from the group consisting of polyetherketone, polyetheretherketone, polyetheretherketoneketone and polyetherketoneketone.

8. A molded article according to claim 6 wherein said homogeneous mixture comprises a blend of from about 33 to to 50 percent by weight polybenzimidazole and from about 67 to 50 percent by weight of a polyaryleneketone.

9. A molded article according to claim 6 wherein the polybenzimidazole is poly-2,2'-(m-phenylene)-5,5'-bibenzimidazole.

10. A molded article according to claim 6 wherein the cut fibers have a length of from about 1/64 inch to about ½ inch.

11. A molded article according to claim 6 wherein said article is selected from the group consisting of O-rings, seal, gaskets and valve seats.

12. A sintered molded article having improved thermal resistance and strength formed from a homogeneous mixture comprising 45 percent by weight polybenzimidazole, 45 percent by weight polyaryleneketone and 10 percent by weight of sulfonated or unsulfonated cut fibers of polybenzimidazole.

13. A molded article according to claim 12 wherein the cut fibers have a length of about 1/32 inch.

* * * * *